United States Patent [19]

Batchelor et al.

[11] 4,369,751
[45] Jan. 25, 1983

[54] LIQUEFIED PROPANE CARBURETOR MODIFICATION SYSTEM

[75] Inventors: William H. Batchelor, Lantana, Fla.; Douglas R. Batchelor, Buchanan, Mich.

[73] Assignee: Ayres Technologies, Inc., West Palm Beach, Fla.

[21] Appl. No.: 177,790

[22] Filed: Aug. 13, 1980

[51] Int. Cl.³ .............................................. F02B 43/00
[52] U.S. Cl. ................................... 123/527; 123/525; 123/489; 48/180 C
[58] Field of Search ............... 123/525, 527, 590, 489; 48/180 R, 180 C; 220/3, 445, 900; 62/49

[56] References Cited

U.S. PATENT DOCUMENTS

| | | | |
|---|---|---|---|
| 2,675,793 | 4/1954 | Ziege | 123/525 |
| 2,752,758 | 7/1956 | Tann | 123/527 |
| 3,081,160 | 3/1963 | Ensign | 123/527 |
| 3,114,357 | 12/1963 | Mortin et al. | 123/527 |
| 3,184,295 | 5/1965 | Baverstock | 123/525 |
| 4,063,905 | 12/1977 | Johnson et al. | 123/527 |
| 4,135,548 | 1/1979 | Sears | 62/49 |
| 4,150,562 | 4/1979 | Nielsen | 123/489 |

Primary Examiner—Ira S. Lazarus
Assistant Examiner—E. Rollins Cross
Attorney, Agent, or Firm—Harvey B. Jacobson

[57] ABSTRACT

A system which can be retrofit into an existing conventional gasoline powered vehicle for enabling the vehicle to operate on either gasoline or liquefied propane fuel. The system includes a mixer in the form of an adapter to fit on the top of an existing carburetor. The mixer has a unique spring balanced metering device which controls flow of gaseous propane to the carburetor in proportion to airflow through the carburetor. The mixer is connected to a regulator assembly which receives liquid propane in a first chamber, heats the liquid propane to form a vapor, and feeds the vapor through an idle valve to control idling of the engine. The vapor is also passed to a second chamber of the regulator assembly in response to demand from the metering device which is sensed by a diaphragm actuated gas flow valve. From the second chamber, the gaseous propane is fed to a high speed inlet of the mixer. Engine manifold vacuum is also used to provide additional control for the gas flow valve to increase efficiency of the system. Other features include a special purpose fuel tank and an optional exhaust system oxygen sensor for further regulating gas flow to the engine.

12 Claims, 8 Drawing Figures

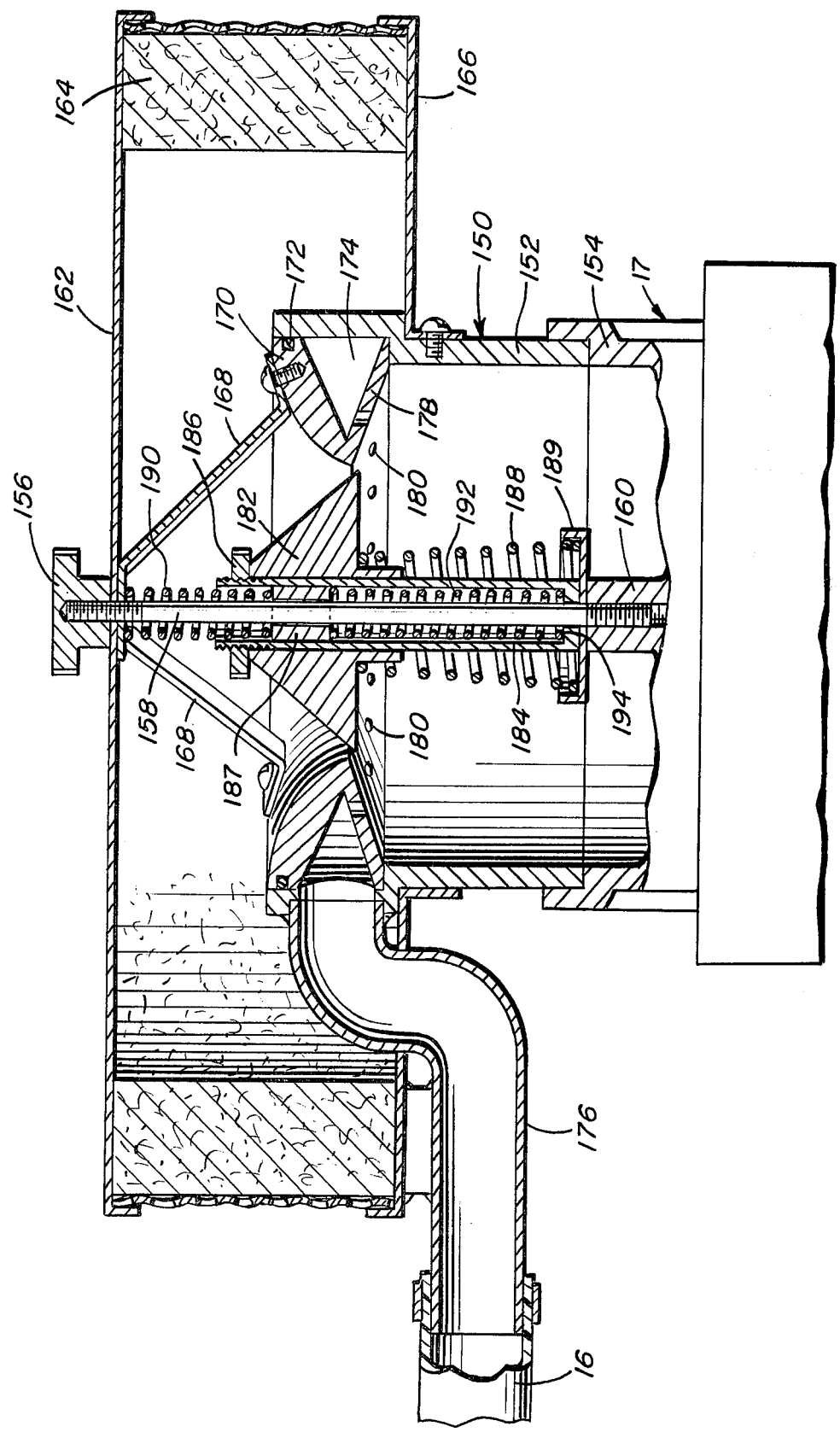

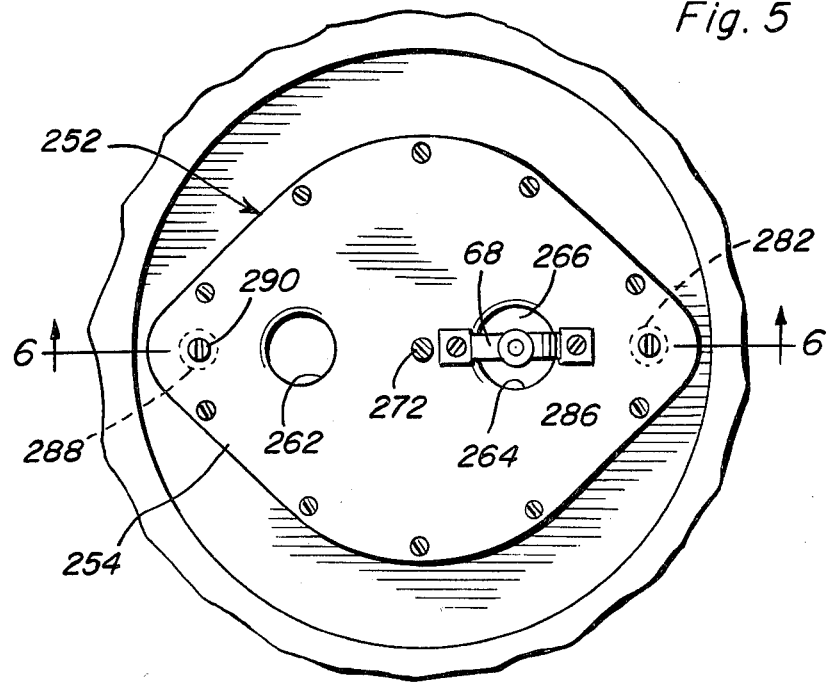
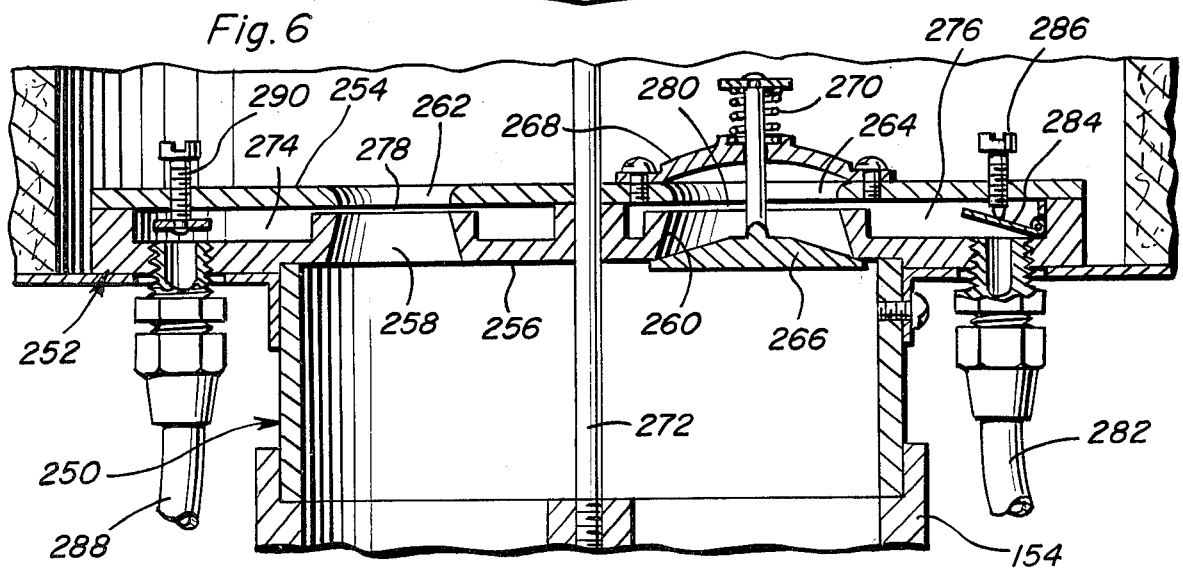
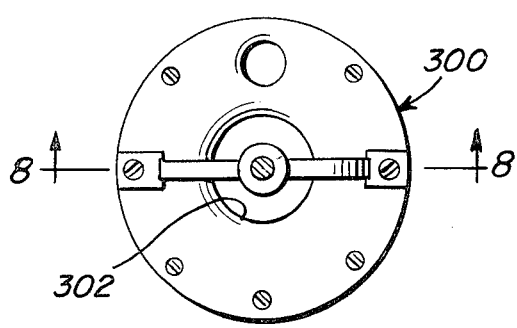
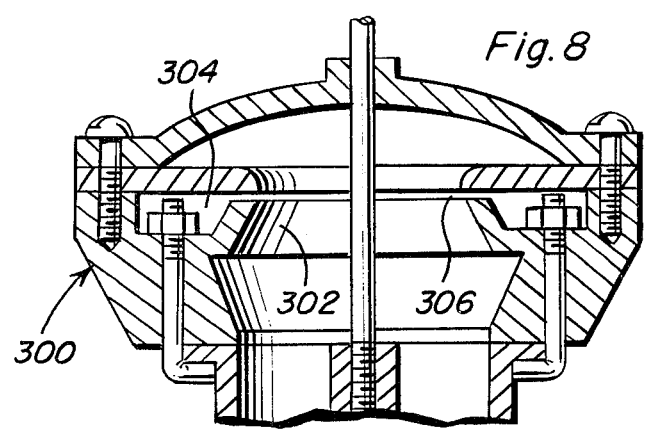

LIQUEFIED PROPANE CARBURETOR MODIFICATION SYSTEM

BACKGROUND OF THE INVENTION

1. Field of the Invention

This invention relates to an apparatus for enabling the operation of a conventional gasoline engine by an auxiliary fuel source such as liquefied propane gas.

2. Discussion of Related Art

The increasingly high cost of conventional gasoline fuels and the increating incidence of low availability of the gasoline leading to long gas lines and short tempers has produced a need for a means of using an auxiliary fuel in a conventional gasoline vehicle.

Furthermore, in view of the high pollution consciousness of society, it is desirable to provide a means of fueling a conventional internal combustion engine which is capable of reducing exhaust gas pollutants to a minimum.

U.S. Pat. No. 3,184,295, issued May 18, 1965 to Baverstock, shows an LPG fuel system for internal combustion engines which includes a vaporizer having a heated metal base member with an inlet for liquid and an outlet for gas. The system utilizes an engine manifold vacuum sensor to control gas pressure. When the vacuum falls below a predetermined level, the regulator pressure is increased. U.S. Pat. No. 3,718,000, issued Feb. 27, 1973 to Walker, shows a dual fuel motor using liquid fuel such as gasoline and a gaseous fuel such as LPG. The Walker system includes exhaust treating devices in the exhaust system that operate efficiently when above a predetermined temperature. A thermally sensitive control change-over from gas to gasoline is effected when the treater reaches a desired temperature and switches back to gas fuel when below a desired temperature. U.S. Pat. No. 3,982,516, issued Sept. 28, 1976 to Abernathy, shows a standby system to provide a gaseous fuel to an internal combustion engine in the event of the failure of a primary source of fuel. The Abernathy system includes a primary source of fuel and a standby source of fuel and a normally open pressure switch which is responsive to a predetermined lower-than-normal pressure in a primary source of fuel to indicate a failure thereof. A vacuum sensor is responsive to engine vacuum and communicates the standby source of fuel to the engine fuel-air mixer when the primary source fails and fuel is demanded by the engine.

While various types of systems have heretofore been provided, as for example those discussed above, for providing auxiliary fuel sources or reduced emissions engine operation, considerable operating problems have been encountered with their use. Also, considerable expense is involved in adapting an existing engine to utilize these systems.

SUMMARY OF THE INVENTION

One object of the present invention is to provide a relatively inexpensive, efficient system for utilizing a gaseous fuel in a conventional internal combustion engine.

A further object of the present invention is to provide a system for the use of LPG which system includes components readily adapted to be retrofit onto existing vehicle internal combustion engine components with a minimum of effort and alteration to the existing components. The elements of the present invention can be mounted at convenient locations within the vehicle and require a minimum of space due to the compact nature of each component.

Another object of the present invention is to provide a system for supplying LPG to an internal combustion engine which system includes a regulator which gasifies the LPG and supplies the gaseous fuel through a first regulator for engine idling and through a second regulator for high speed engine operation. The second regulator emits fuel to the carburetor in proportion to air drawn through the carburetor throat. This proportionate relationship is modified in response to engine manifold vacuum and can be further optionally modified in response to oxygen content in the exhaust gases of the engine in order to increase efficiency and reduce pollutants admitted to the atmosphere.

Another object of the present invention is to provide a liquefied propane system including a fuel tank designed expressly for use in the motor vehicle, incorporating a safety cut-off valve, sensors for an electronic fuel level gauge, and an outer seal of the shell for use when the tank is mounted inside the vehicle, the outer shell being vented to the atmosphere thereby preventing gas from leaking into the vehicle interior.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a vertical sectional view of the LPG storage tank;

FIG. 4 is a vertical sectional view of the fuel-air mixer;

FIG. 5 is a plan view of a second form of mixer;

FIG. 6 is a vertical sectional view taken substantially upon the section line 6—6 of FIG. 5;

FIG. 7 is a plan view of a third form of mixer; and

FIG. 8 is a vertical sectional view taken substantially upon the section line 8—8 of FIG. 7.

DESCRIPTION OF THE PREFERRED EMBODIMENT

Figure 1:
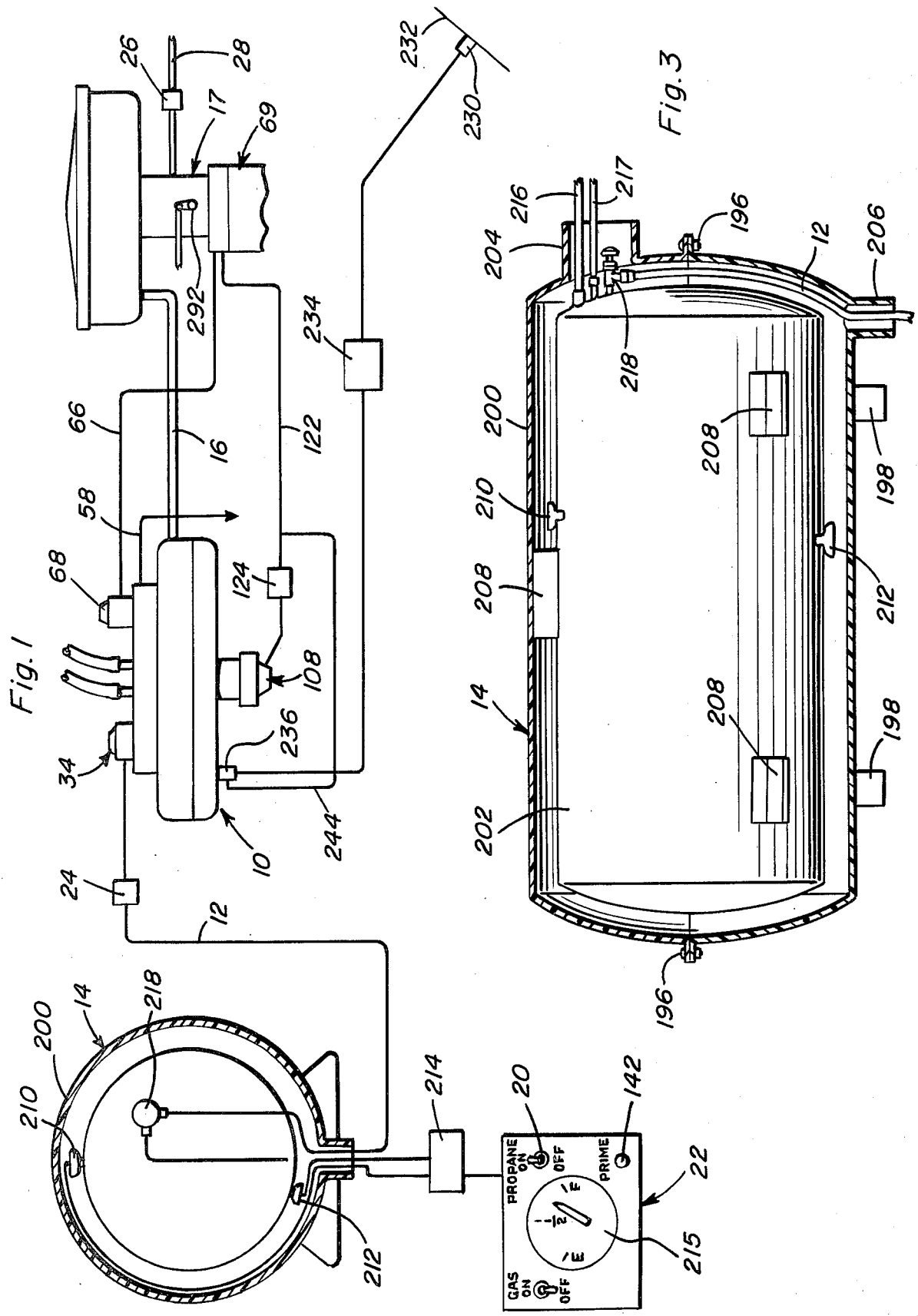
FIG. 1 is a schematic representation of the liquefied propane system.

Now with reference to the drawings, a liquefied propane carburetor modification system incorporating the principles and the concepts of the present invention will be described in detail. With specific reference to FIG. 1, it can be seen that the system includes a gas regulator unit 10 which receives liquefied propane through line 12 from storage tank 14. The gaseous propane is channeled from the regulator unit 10 through supply tube 16 to carburetor 17 for supplying the internal combustion engine (not shown) connected to the carburetor with fuel. The propane supply can be interrupted manually by operating switch 20 mounted on the indicator and the control panel 22. Switch 20 controls a solenoid valve 24 located in liquid propane supply line 12. A second switch 23 operates a second solenoid valve 26 contained within gasoline supply line 28 from the engine fuel pump (not shown). Accordingly, by moving the switch 20 to the "on" position, valve 24 is opened allowing liquid propane from tank 14 to enter the regulator 10. At the same time, switch 21 would be moved to the "off" position thereby causing solenoid valve 26 to shut-off gasoline flow through supply tube 28 to the carburetor. Reverse actuation of each of these switches would of course return conventional gasoline supply and operation to the internal combustion engine.

Figure 2:
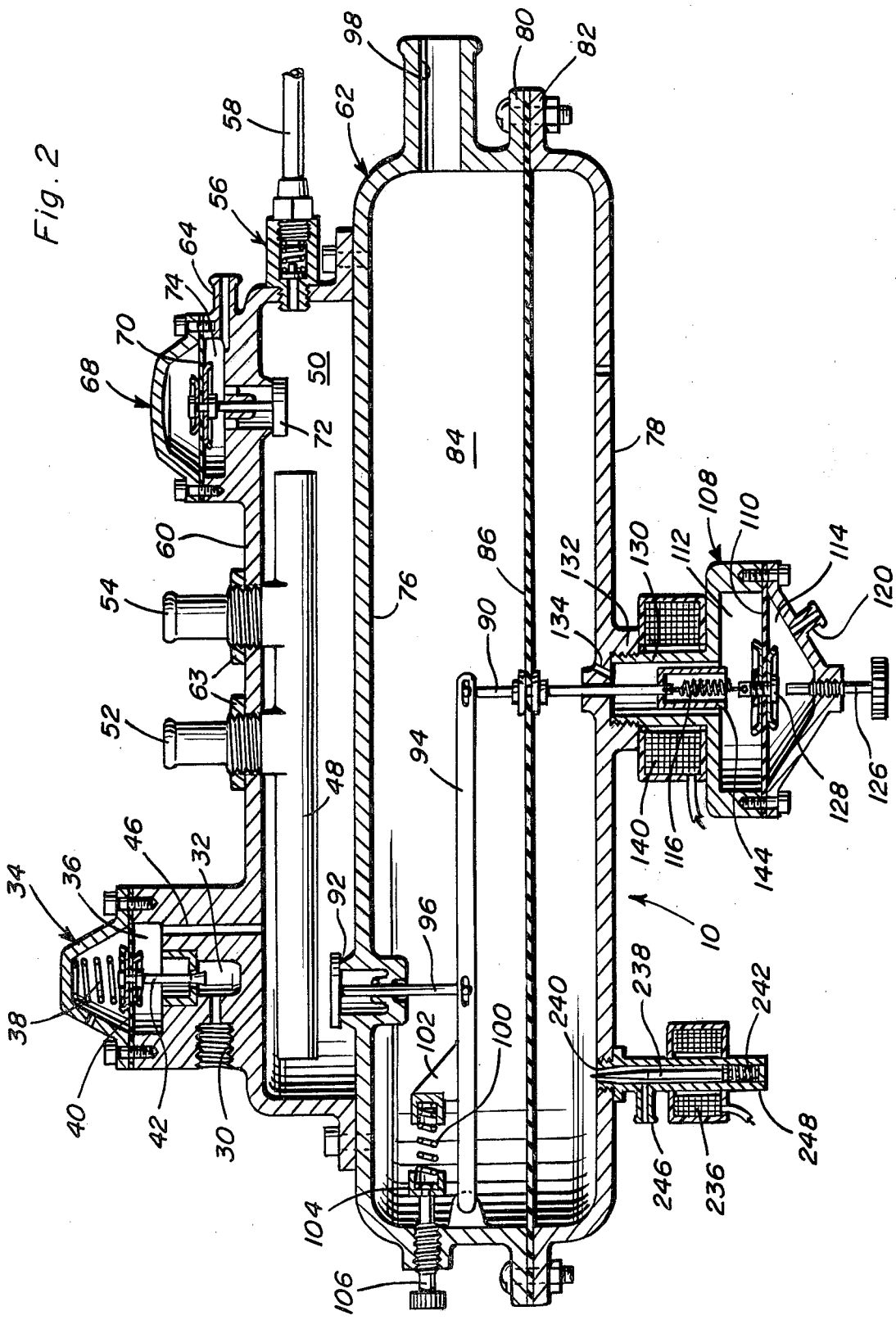
FIG. 2 is a vertical sectional view of the regulator unit of the system.

With reference to FIG. 2, it can be seen that the gas regulator unit 10 comprises a liquid propane inlet 30 for connection to supply line 12. The liquid propane entering inlet 30 is channeled to chamber 32 of pressure regulator 34. Pressure regulator 34 lowers the pressure of the liquid propane to 5 psi in a conventional manner by balancing the pressure of the liquid propane contained in upper chamber 36 against the force of spring 38. The pressure of the liquid propane acts against diaphragm 40 to which spring 38 is connected. Valve member 42 is also connected to the diaphragm and stops communication between chambers 32 and 36 when the appropriate pressure causes displacement of the diaphragm.

The liquid propane in chamber 36 is allowed to flow through vertically oriented port 46 onto heater unit 48 contained in liquid-to-gas conversion chamber 50. Heater 48 is supplied with hot engine cooling fluid through inlet 52 and outlet 54 which are connected in the internal combustion engine heating system by use of heater hoses, standard connectors and the like. The liquefied propane is gasified by contact with the heater unit 48 and fills chamber 50. Excess gas pressure in chamber 50 may be vented by relief valve 56 which is a standard spring-biased relief valve allowing communication with overflow tube 58 which can release the gaseous propane into the atmosphere or into a low pressure storage tank as desired. It is noted that the chamber 50 is formed from an upper casting 60 which is bolted to a lower casting 62. The heater unit 48 is mounted in casting 60 by the use of nuts 63 which attach to threaded surfaces formed around the inlet 52 and outlet 54 of the heater unit 48. Accordingly, the heater unit 48 can be formed separately and incorporated in the device upon assembly. Also formed in the casting 60 is an outlet port 64 which is connected by a gas supply tube 66 to the intake manifold 69 shown in FIG. 1. Gas flow through tube 66 is controlled by regulator 68 which comprises a diaphragm 70 and a valve member 72. The pressure of the gas is properly regulated to ensure adequate supply for engine idling purposes. The regulator is a standard type wherein the diaphragm is displaced downwardly thereby opening valve 72 when engine demand is sensed through a reduction in pressure in chamber 74 below the diaphragm. Sufficient fuel is fed through valve 72 to supply the engine. When engine demand for a supply of idle fuel is reduced, the pressure in chamber 74 is increased and the valve is closed by operation of diaphragm 70.

The lower casting 62 comprises an upper half 76 and a lower half 78 which are attached by bolts extending between flanges 80 and 82 to form chamber 84. Chamber 84 is divided by a diaphragm 86 which is secured between flanges 80 and 82. The diaphragm 86 attaches to actuation rod 90 so that displacement of the diaphragm opens valve 92 through attachment of rod 90 to lever arm 94 which connects to valve arm 96. Engine demand is sensed by a change in pressure in chamber 84 above the diaphragm through outlet port 98 which connects through supply tube 16 to the carburetor 17 as will be discussed hereinafter. When the pressure in chamber 84 above the diaphragm 86 falls below zero psi, the diaphragm is displaced upwardly thus opening valve 92 against the force of spring 100 which extends between offset spring mount 102 formed by the lever rod 94 and cup 104 which is attached to the end of adjustment screw 106 which extends through the wall of casting 62. Accordingly, it can be seen that when demand is sensed by lowering of the pressure, gas is allowed to enter the engine via valve 92 and outlet port 98.

An additional feature of the invention includes vacuum controlled regulator unit 108 which comprises diaphragm 110 dividing the regulator into upper chamber 112 and lower chamber 114. The diaphragm 110 is attached to actuator rod 90 through coil spring 116 which provides additional tension against the upward displacement of lever arm 94. Accordingly, if a low pressure is sensed in lower chamber 114, the diaphragm 110 is displaced downwardly thus increasing the force against which the low pressure in the upper portion of chamber 84 must act in order to allow additional gaseous vapor to enter the engine. This produces an economizing effect upon the use of fuel when the lower chamber 114 is connected through port 120 to the intake manifold 69 by line 122 shown in FIG. 1. Additionally, as depicted schematically in FIG. 1, a vacuum actuated valve 124 is included in line 122. Valve 124 closes completely during engine idling. The maximum effect of the regulator 108 can be controlled by adjustment screw 126 disposed through the bottom of the regulator housing. Adjustment screw 126 is threadedly connected to the housing and can be moved up or down in order to act as a stop against which connector 128 abuts during the vertical downward displacement of diaphragm 110. As is apparent from FIG. 2, connector 128 passes through the diaphragm and actually mounts the spring 116 to the diaphragm. In this manner, the maximum effect of regulator 108 can be limited by properly setting adjustment screw 126. It is also noted that the regulator connects to the lower portion 78 of casting 62 by threaded engagement comprising threads formed on the upper portion of regulator neck 130 which engage internal threads formed on mounting boss 132. A port 134 communicates the area below diaphragm 86 in chamber 84 with the upper chamber 112 of the regulator in order to balance the movement of the regulator in accordance with pressure in the lower portion of chamber 84.

When the engine is initially started, it is sometimes desirable to prime the engine with a free flow of fuel for a short period of time. In order to accomplish this result, a solenoid coil 140 is mounted about neck 130 of the regulator 108. The coil can be actuated by depression of switch 142 seen in FIG. 1 on panel 22. Energization of coil 140 causes upward movement of cylindrical member 144 which is attached to rod 90 and surrounds the spring 116. Member 144 acts as the solenoid armature and naturally should be formed of a magnetic material. Member 144 moves upwardly centering itself axially of the coil and at the same time forces rod 90 up to open valve 92. Valve 92 is kept open thus allowing a free flow of gas to the engine as long as the prime switch 142 is depressed. Naturally, switch 142 could be a time delay switch which releases after a predetermined time to ensure that an excess of fuel does not enter the engine.

The fuel exiting outlet 98 flows through supply line 16 into the carburetor 17 via mixer 150 shown in detail in FIG. 4. The mixer is actually an adapter comprising cylindrical housing 152 which fits into the throat 154 of the existing automobile carburetor 17. The housing 152 fits within a recess in throat 154 and is held therein by a threaded knob 156 which fits over and threadedly engages shaft 158. Shaft 158 threadedly connects to boss 160 which is a conventional fixture formed in the carburetor throat. The knob 156 also mounts cover plate 162 which retains air filter 164 on the lower filter mounting plate 166. The lower mounting plate threadedly attaches to the cylindrical housing 152. The cover plate 162 overlies three equilaterally spaced braces two of which are shown at 168. Braces 168 screw onto annular gas dispersion chamber housing 170 which is fixedly mounted in an upper recess of the housing 152. An O-ring 172 is fitted into an annular groove in housing 170 to ensure no leakage of gas from gas dispersion chamber 174 to the atmosphere. Chamber 174 communicates with the outlet port 98 of regulator unit 62, shown in FIG. 2 through inlet port 176 which is attached to supply tube 16. The lower surface of the housing 170 comprises a radially inward extending upwardly inclined wall 178 having a plurality of gas dispersion ports 180 formed therein circumferentially spaced about the wall. Gas is drawn through ports 180 from inlet 176 in proportion to the airflow through the carburetor throat by use of a floating spring-balanced meter element 182. Meter element 182 is a frustum shaped element having a central aperture slidably mounted on sleeve 184. Element 182 is biased upwardly against nut 186 by spring 188 which rests in cup 189 on boss 160. Accordingly, the element 182 can move downwardly against the force of spring 188 as airflow drawn into the carburetor throat increases. The frustum shape of the element 182 ensures that incoming air is channeled past apertures 180 thus drawing propane gas from the apertures at a rate in proportion to the airflow.

In order to guard against damage to the mixer components during engine backfire through the carburetor, the sleeve 184 is slidably mounted on shaft 158 and held in spaced relation thereto by a spacer 187. Above and below the spacer 187 are coil springs 190 and 192, respectively, which abut against the base 194 of the spacer and are held on the shaft at the upper end by knob 156. Thus, the spacer can move upwardly against the force of springs 190 and 192 when pressure is applied from below as through backfiring. This allows the element 182 to move upwardly thus clearing the area inward of housing 170 for the combustion gases to exit through upon backfire.

Now again with reference to FIG. 1 and with reference to FIG. 3, the tank 14 designed for use in the present system will be described in detail. Tank 14 includes an outer shell 200 which surrounds and mounts inner shell 202 which contains the liquid propane fuel. Shell 200 contains vent openings 204 and 206 which vent the space between shells 200 and 202 to the atmosphere when the tank 14 is to be contained within a vehicle. A plurality of mounts such as shown at 208 space the tank 14 inwardly of shell 200. Pressure sensors 210 and 212 are mounted respectively through the upper and lower portions of the shell 202 and measure the pressure within the shell. The sensors communicate with electronic circuit 214 which detects the difference between the pressures measured by the sensors to give an indication of fuel level which is displayed on gauge 215 of panel 22. Naturally, when the fuel level in shell 202 becomes low, the tank should be filled through filler tube 216 which extends from the tank to a convenient location. An overflow and vent tube 217 is also connected to the shell 202 and is disposed in a convenient location on the vehicle. Fuel line 12 is connected to the shell 202 through valve 218 which is a commercially available safety valve which shuts off fuel flow through the line 12 in the event that the tube is ruptured.

It can be seen that the outer shell 200 can be formed in two portions which are bolted together as shown at 196. The tank can also contain mounting supports 198 for holding it level on a surface. Other features of the tank such as the material from which it is made and the exact shape of each of the tank shells can be varied according to the area in which it is to be mounted.

An optional feature to further enhance the economy and usability of the invention includes the connection of an oxygen sensor 230 to the engine exhaust line 232 as depicted schematically in FIG. 1. The oxygen sensor 230 can be a commercially available device as sold by the Ford Motor Company as part No. D8FZ9F4728. The output of sensor 230 is proportional to the oxygen level in the exhaust gases and is directed to an electronic circuit 234 which causes actuation of solenoid 236 shown schematically in FIG. 1 and in further detail in FIG. 2. Actuation of solenoid 236 causes downward displacement of a needle valve 238 which is mounted therein. Normally, the needle valve 238 is biased upwardly into port 240 by a spring 242. Thus, port 240 is normally closed off. When the solenoid is actuated, the port effective area is increased thus allowing communication of vacuum from the engine intake manifold 69 through line 122, line 244 and port 246 to lower the pressure in the lower portion of chamber 84 below diaphragm 86. This lowered pressure is of course dependent upon the vacuum in the manifold and increases the force against which the diaphragm 86 must move to increase gas flow to the carburetor. Thus, when increased emissions are detected in the exhaust by an increased level of oxygen and the engine manifold vacuum is at a maximum indicating lower fuel demand by the engine, the diaphragm 86 is pulled downwardly with the greatest force by a vacuum disposed below it thereby reducing gas flow to the engine. Whenever the oxygen level is higher than desired, the solenoid 236 is actuated thus increasing the resistance against which the diaphragm 86 must be moved thereby reducing gas flow to the engine. Obviously, the additional force against which diaphragm 86 must move is determined by the manifold vacuum level and thus is dependent on engine demand.

While the actual structure of the needle valve configuration can vary, as shown, the housing 248 slidably mounts the needle valve 238 and the spring 242. The housing contains upper external threads which mate with internal threads of an aperture formed through the wall of casting 78.

In operation, initially switches 20 and 21, shown on panel 22 of FIG. 1, should be moved to the "on" and "off" positions, respectively. This then opens solenoid valve 24 and closes solenoid valve 26. In the absence of a rupture in line 12, valve 218 would also be open allowing liquid propane to pass through line 12 into regulator 34 shown in FIG. 2. That regulator reduces the pressure of the liquid propane to 5 psi. The liquid propane then flows through port 46 onto the heater 48 which vaporizes the propane.

When the engine is to be started, switch 142, again shown on panel 22 of FIG. 1, is depressed thereby actuating solenoid 140, shown in FIG. 2. This causes upward movement of lever arm 94 opening valve 92 allowing a free flow of gaseous propane through chamber 84 and port 98 into the carburetor through ports 180, shown in FIG. 4. The engine thus is provided with sufficient fuel to start when cold. Once the engine is started and idling, the solenoid 140 is deactuated and fuel for engine idling is supplied through regulator 68 shown in FIG. 2 and line or supply tube 66 shown in FIG. 1 directly to the intake manifold 69. During engine idle, vacuum valve 124 is closed off thereby eliminating any effect on regulator 108. When the vehicle accelerator is depressed the vacuum in intake manifold 69 is reduced and the valve 124 is opened thus communicating the vacuum to regulator 108. At the same time, propane is drawn from chamber 84, shown in FIG. 2, through port 176, shown in FIG. 4, into the carburetor in proportion to the airflow through the carburetor port by action of the metering device 182. An increase in airflow indicating a increased demand by the engine draws additional fuel from the chamber 84 by causing upward displacement of diaphragm 86 opening valve 92 of the regulator unit, shown in FIG. 2. Balanced against this force, is the vacuum sensed by regulator 108 from the intake manifold. Large manifold vacuum indicates small engine demand and thus diaphragm 110 of regulator 108 is moved downwardly allowing less gas to exit from chamber 84. As engine demand increases, the vacuum also decreases thus reducing the force against which diaphragm 86 must move.

In the event that oxygen sensor 230 of FIG. 1 is also included in the system, when high oxygen levels are sensed in the exhaust gases, a reduction in gas flow to the engine is effected via solenoid 236 which opens allowing vacuum from the engine manifold to communicate with chamber 84 below the diaphragm thus increasing the resistance against which that diaphragm must move.

Referring now more specifically to FIGS. 5 and 6 of the drawings there may be seen a modified form of mixer referred to in general by the reference numeral 250 and which may be mounted on the carburetor throat 154 in lieu of the mixer 150. The mixer 250 includes a hollow housing referred to in general by the reference numeral 252 including a removable top wall and a bottom wall 256 through which first and second small and large diameter ports 258 and 260 are formed. The top wall 254 has a pair of small and large diameter rounded edge openings 262 and 264 formed therein in registry with the ports 258 and 260 and a spring-biased meter element 266 corresponding to the meter element 182 is supported for shifting between positions opening and closing the port 260 by a support frame 268 carried by the top wall 254 and a compression spring 270. The bottom and top walls 256 and 254 include central vertical passages therethrough for receiving the carburetor air cleaner hold-down bolt 272 corresponding to the shaft 158 and the interior of the housing 252 defines a pair of hollow chamber portions 274 and 276 disposed about the ports 258 and 260. A narrow annular passage 278 extends about and opens into the port 258 below the opening 262 and communicates the chamber portion 274 with the port 258 in the venturi area defined by the port 258. A slightly wider annular passage 280 is disposed about and opens into the inlet end of the port 260 beneath the top wall 254 and communicates the chamber portion 276 with the port 260 in a venturi area defined by the port 260.

The mixer 250 receives a source of primary vaporized fuel through a supply line 282 extending from a regulator and vaporizer assembly similar to that indicated as at 10, but somewhat modified in that the modified regulator unit supply vaporized fuel to the mixer 250 does not include the components 64, 68, 70 and 74 of the unit 10. The supply line 282 opens into the chamber portion 276 through a gaseous fuel flow opened restrictor valve 284 having an adjustable stop member 286 operatively associated therewith for limiting movement of the valve 84 toward the open position.

In addition, a supply line 288 extends from the aforementioned modified regulator unit and opens into the chamber portion 274, the outlet end of the line 288 having an adjustable throttle valve 290 threadedly engaged with the top wall 254 operatively associated therewith. Also, the aforementioned modified regulator may supply an adjustably throttled amount of gaseous fuel to a fuel idle port of the associated carburetor. However, the port 258 is utilized, in conjunction with the conventional throttle valve 292 of the associated carburetor 17 for supplying a primary supply of vaporized fuel to the primary inlet port 58. During periods of high engine demand for air and fuel, the valve 266 is opened against the closing action of the spring 270 and a secondary supply of vaporized fuel is supplied to the port 260 from the chamber portion 276 through the annular slot 280. Thus, it may be seen that the mixer 250 comprises a simplified unit as compared to the mixer 150.

With attention now invited more specifically to FIGS. 7 and 8 of the drawings, there will be seen a third form of mixer referred to in general by the reference numeral 300 and which is to be utilized in conjunction with the inlet passages of a diesel engine. The mixer 300 defines an inlet port 302 corresponding to the port 258 and a hollow chamber portion 304 corresponding to the hollow chamber portion 274 to which vaporized fuel may be supplied from a modified regulator unit for vaporizing liquefied fuel. The vaporized fuel may be admitted into the hollow chamber portion 304 corresponding to the hollow chamber portion 274 in any convenient manner (not shown) and may be discharged from the hollow chamber portion 304 through the annular slot 306 surrounding the port 302. When the mixer 300 is utilized in conjunction with a diesel engine, the diesel engine is supplied induction air in the usual manner and diesel fuel is injected into the combustion chambers of the diesel engine through utilization of conventional diesel fuel injectors. However, the mixer 300 is disposed upstream in the diesel engine induction system from the air flow controlling throttle valve or valves thereof and is operative to admit gaseous fuel into the induction system of the diesel engine at a rate equal to approximately 20% of the usual fuel-to-air ratio. Although the total amount of fuel which is therefore provided to the engine at any given throttle setting thereof is greater, the amount of power developed by the engine is in excess of 20% more than would be developed without the gaseous fuel mixer, resulting in an over-all greater efficiency of operation of the engine. Further, by admitting vaporized liquefied gas into the induction system of a diesel engine, the diesel fuel being burned in the engine is more completely burned and the exhaust gases being discharged from the diesel engine are considerably more free of air pollutants.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an internal combustion engine having an engine block, at least one combustion chamber, an intake manifold for channeling fuel to said combustion chamber and a carburetor mounted on said intake manifold, the improvement comprising a storage tank for storing liquefied gaseous fuel; a regulator and vaporizer means for vaporizing said liquefied gaseous fuel and regulating the flow of said liquefied gaseous fuel, said vaporizer and regulator means including a first chamber for receiving said liquefied gaseous fuel from said tank, said first chamber having a first outlet port containing a gaseous fuel flow regulator, said first outlet port being connected to said intake manifold, and a second chamber containing a second outlet port, said second chamber being divided into upper and lower portions by a diaphragm, valve means actuated by said diaphragm for selectively communicating said second chamber with said first chamber; and mixer means connected to said carburetor, said mixer means having an inlet port connected to said second outlet port for receiving gaseous fuel therefrom and mixing said gaseous fuel with combustion air, said mixer means defining a venturi structure including large cross sectional area inlet and outlet ends and a smaller cross sectional area midportion intermediate said large cross sectional area ends and further defining a gas receiving chamber disposed substantially entirely about said venturi passage and with which said inlet port is communicated, said smaller cross sectional area midportion of said venturi structure including at least a substantially continuously peripheral slot formed therein opening outwardly from the outer periphery of said smaller cross sectional area midportion into the immediately surrounding portions of said gas receiving chamber and communicating the latter with the outer periphery of the smaller cross sectional area venturi midportion, said large cross-sectional area outlet end being communicated with said intake manifold and said large cross sectional area inlet end being adapted to receive filtered induction air.

2. The invention as defined in claim 1 wherein said storage tank includes an outer shell and an inner shell, said inner shell being mounted centrally of and perimetrically spaced from said outer shell.

3. The invention as defined in claim 2 wherein said inner shell further includes at least two pressure sensor means, one of said pressure sensor means being mounted through the top of said inner shell for measuring the pressure in the top portion of said inner shell and the other of said pressure sensor means being mounted through the bottom of said inner shell for measuring the pressure in the bottom portion of said inner shell, and circuit means for receiving the outputs of said pressure sensors and producing a signal proportional to the fuel level in said inner shell.

4. The invention as defined in claim 3 and further including vent means for communicating the space between said inner and outer shells to the surrounding atmosphere.

5. The invention as defined in claim 1 and further including vacuum operated diaphragm means connected to said intake manifold for yieldably resisting movement of said second chamber diaphragm in response to increases in vacuum in said intake manifold.

6. The invention as defined in claim 5 and further including exhaust gas analyzer means for sensing pollutants in the exhaust of said internal combustion engine and restricting movement of said diaphragm in response to an excess level of pollutants.

7. The invention as defined in claim 6 wherein said exhaust gas analyzer means comprises an oxygen sensor.

8. An internal combustion engine having an induction system including an intake manifold for channeling intake air to a combustion chamber of said engine, a storage tank for storing liquefied gaseous fuel under pressure, a regulator and vaporizer means for receiving liquefied fuel from said tank, reducing the pressure of received fuel and vaporizing the fuel, air and vaporized fuel mixer means connected to said intake manifold, said mixer means including at least one inlet port for air and defining a venturi zone of reduced cross-sectional airflow area, said mixer means including a gaseous fuel chamber to which gaseous fuel is supplied from said vaporizer means and from which gaseous fuel is discharged into said venturi zone at points spaced thereabout, said induction system including adjustable airflow throttling means disposed downstream from said mixer means, said venturi zone being defined by a venturi structure including large cross-sectional area inlet and outlet ends and a smaller cross-sectional area midportion intermediate said large cross-sectional ends, said fuel chamber including portions thereof disposed substantially entirely about said smaller cross-sectional area midportion, said smaller cross-sectional area midportion of said venturi structure including at least a substantially continuous peripheral slot formed therein opening radially outwardly from said smaller cross-sectional area midportion into said portions of said chamber and thereby communicating the latter with the outer periphery of said smaller cross-sectional area midportion, said large cross-sectional area outlet end being communicated with said intake manifold and said large cross-sectional area inlet end being adapted to receive filtered induction air.

9. The combination of claim 8 wherein said points of discharge of gaseous fuel about said venturi zone comprise spaced portions of said substantially continuous peripheral slot extending about said venturi zone.

10. The combination of claim 9 including a combined pressure differential and airflow responsive valve associated with said port for opening and throttling said port upon increases and decreases in demand of intake air to said combustion chamber.

11. The combination of claim 8 wherein said mixer means also defines a second inlet port for air including a corresponding venturi zone, said second port being smaller in cross-sectional area than said first port, said mixer means defining a second gaseous fuel chamber to which gaseous fuel is supplied from said vaporizer means and from which gaseous fuel is discharged into the venturi zone of said second port at points spaced thereabout.

12. The invention as defined in claim 1 including heating means in said first chamber for heating said liquefied gaseous fuel and thereby vaporizing the latter.

* * * * *